United States Patent [19]

Scribner et al.

[11] Patent Number: 4,688,026
[45] Date of Patent: Aug. 18, 1987

[54] METHOD OF COLLECTING AND USING DATA ASSOCIATED WITH TAGGED OBJECTS

[76] Inventors: James R. Scribner, 7694 Parkwood Ct., Waterford, Mich. 48095; Thomas G. Brown, 6410 Woodland, Utica, Mich. 48087; Anthony Caracciolo, Jr., 1756 Welling, Troy, Mich. 48098

[21] Appl. No.: 854,152

[22] Filed: Apr. 21, 1986

Related U.S. Application Data

[63] Continuation-in-part of Ser. No. 610,612, May 15, 1984, abandoned.

[51] Int. Cl.[4] .............................................. H04Q 1/00
[52] U.S. Cl. ...................................... 340/572; 342/44
[58] Field of Search ............. 340/572, 825.54, 825.69, 340/825.72; 342/42, 44

[56] References Cited

U.S. PATENT DOCUMENTS

| | | | |
|---|---|---|---|
| 3,780,368 | 12/1973 | Northeved et al. | 340/572 X |
| 3,859,624 | 1/1975 | Kriofsky et al. | 343/6.5 R X |
| 3,891,980 | 6/1975 | Lewis et al. | 340/572 |
| 3,906,447 | 9/1975 | Crafton | 340/825.31 X |
| 4,023,167 | 5/1977 | Wahlstrom | 343/6.5 SS |
| 4,114,151 | 9/1978 | Denne et al. | 343/6.5 R X |
| 4,333,072 | 6/1982 | Beigel | 340/572 X |
| 4,388,524 | 6/1983 | Walton | 343/6.5 R X |
| 4,525,713 | 6/1985 | Barletta et al. | 340/825.54 |

Primary Examiner—Ulysses Weldon
Attorney, Agent, or Firm—Harness, Dickey & Pierce

[57] ABSTRACT

Tags capable of wirelessly transmitting unique codes when energized by radio frequency (RF) energy are used to identify a variety of different locations and objects. A portable battery-powered unit having digital storage capabilities is designed to be transported to the general location of the tagged locations and objects. The user moves an RF antenna sufficiently close to the tag to energize it and cause the tag to transmit its code. The detected code is then stored in digital form in a memory. The location tags contain an association or master list of the objects associated with that particular location. The method finds particular utility in performing inventory control of furniture or other objects since the tags can be mounted at points thereon that are not readily observable, thereby preserving their aesthetic appearance. Other methods include patient identification in a health care facility, project scheduling, quality control, interior decorating, or any other procedure where identification of a particular object or location is a preliminary step before proceeding with further work. Preferably, a programmable device having a display is used to prompt the operator after the object or location has been detected.

12 Claims, 8 Drawing Figures

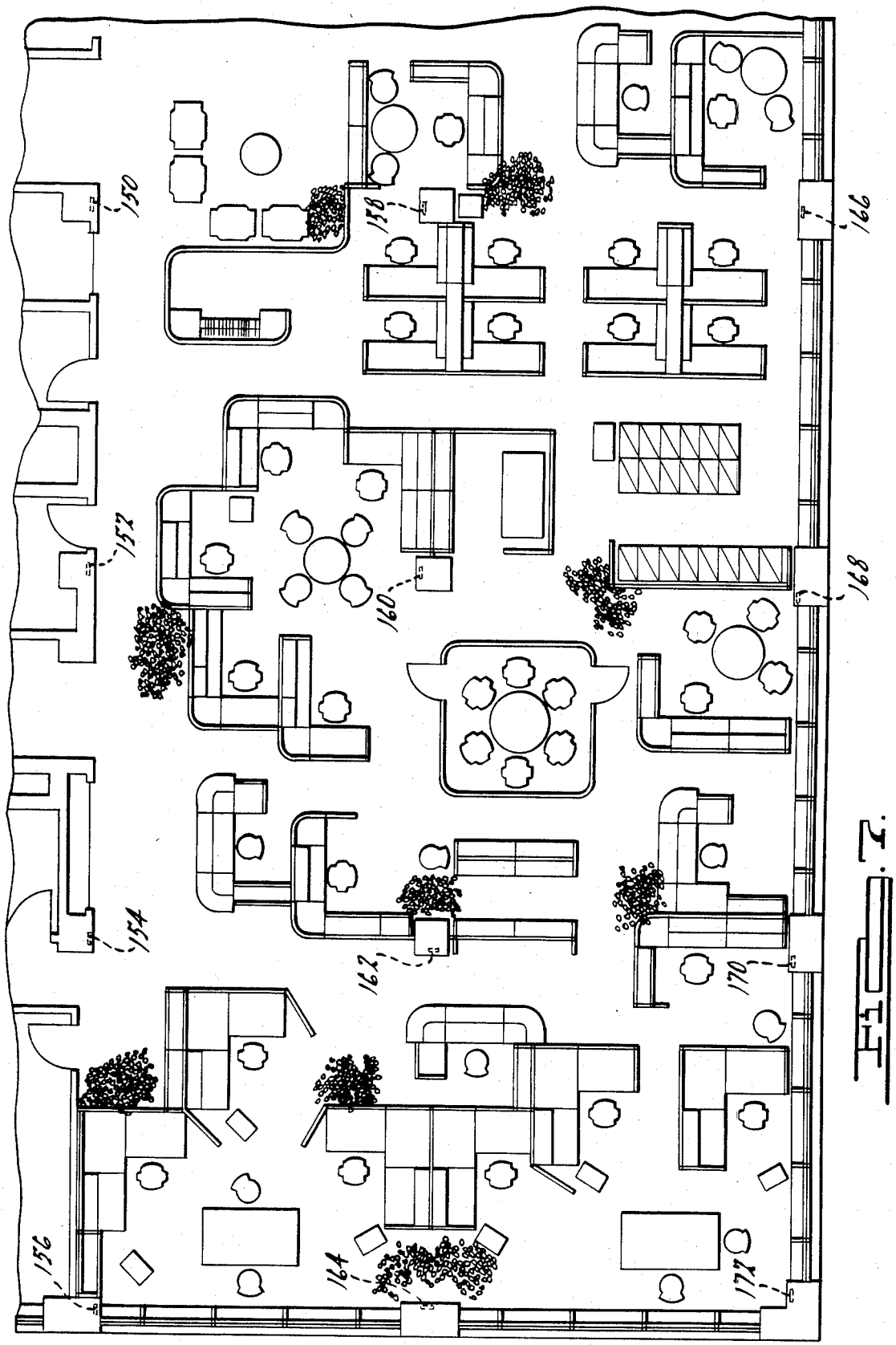

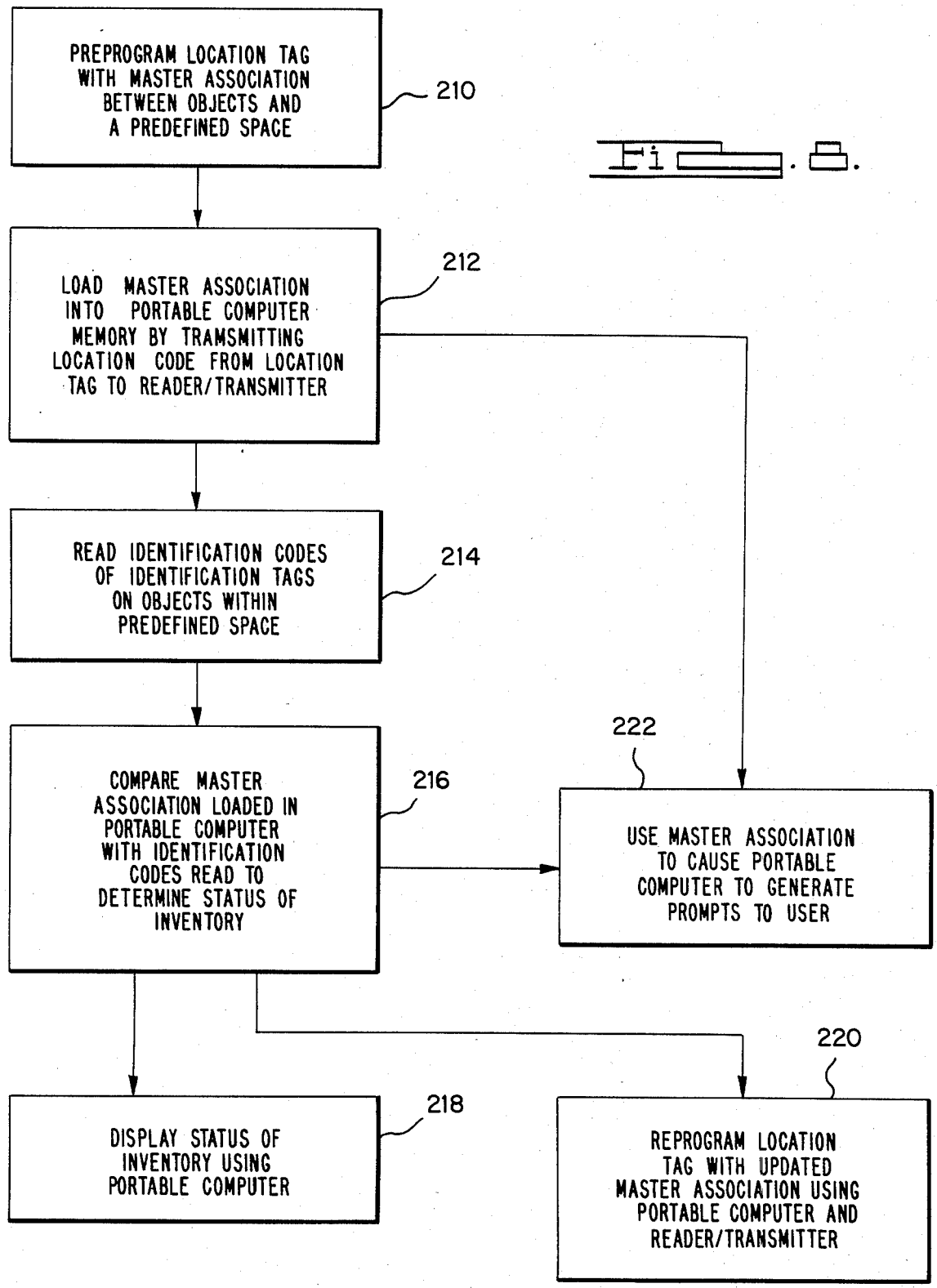

METHOD OF COLLECTING AND USING DATA ASSOCIATED WITH TAGGED OBJECTS

This is a continuation-in-part of U.S. patent application Ser. No. 610,612, filed May 15, 1984, by James R. Scribner, et al., entitled "Method of Collecting And Using Data Associated With Tagged Objects" now abandoned.

BACKGROUND OF THE INVENTION

This invention relates to methods for identifying persons or things and, more particularly, to such methods wherein the persons or things are provided with identification tags.

There exists a wide variety of applications for methods of identifying persons or objects. Inventory control is one of them. There are many reasons for providing an inventory list of articles owned or used by a particular business or individual. An accurate inventory provides management with information relating to the identification and location of its tangible assets or components that are used to produce its end products. An accurate list of these items is useful for determining property taxes, depreciation and the like for scheduling product maintenance and work loads as well as providing records for establishing claims for fire loss, theft or other causes.

Various methods of conducting inventory have been used in the past. They range from simple manual approaches to semiautomatic techniques using computerized data collection devices. One of the more sophisticated approaches employs the use of bar code tags or uniform product code (UPC) labels affixed to or adjacent to the goods which can be read with a bar code reader. One of the disadvantages wit this type of system, however, is that the bar code tag must be placed in a position that is easily accessible to the bar code reader and the reader must come within close proximity of the tag in order to sense the code thereon. Consequently, it is necessary for the operator to find the tag and, one found, to maneuver the reader to a position closely adjacent the tag in order to read the code. These requirements generally dictate that the tag must be mounted in a readily observable and accessible position. Even if these requirements are met, it still takes an appreciable amount of time for the operator to perform the data collection task since he is required to move very close to the object in order to perform the necessary operations.

Taking inventory of furniture, art objects or the like poses a special problem. For these aesthetic objects it is not desirable to place tags at points where they can be observed because doing so would destroy their aesthetic appearances. If conventional tags are placed at a hidden location, it becomes difficult for the person doing inventory to find the tags and, once found, it can be awkward to read them. Not only is this a problem when taking inventory of furniture and the like in an office building, it is also a problem for doing inventory of systems or modular components that can be assembled together to form a finished piece of furniture. Therefore, the aforementioned problem is also encountered in performing inventory of these items in a furniture manufacturer's warehousing facility.

In accordance with the teachings of the present invention, identification tags are mounted on objects or objects associated with persons. Unlike conventional identification tags, these tags have the capability of wirelessly transmitting identification codes associated with a particular object over a distance of at least one foot. In addition, location tags, also capable of wireless transmission, are mounted on fixed structures associated with a predefined space, such as adjacent the doorway of a room. The location tags are preprogrammed to contain a location code indicative of the predefined space or room and also preprogrammed to contain an association between the predefined space or room and the objects to be found within that space or room. In an inventory control application, the preprogramed or prestored association may be in the form of a master list containing the location code together with a list of the identification codes of objects to be found within that space or room. A portable, battery operated unit containing a pickup or sensor device is used to detect the transmitted codes from the identification and location tags.

The identification tags and location tags are both provided with random access memory capable of storing a great deal of useful information concerning the objects (or persons) within a predefined space or room, as well as information concerning the predefined space or room itself. The portable unit first downloads the location code which contains the preprogrammed association or master plan associated with the particular space or room. Having down loaded this information, the portable unit is then used to detect the identification tags of objects within the predefined space or room, with the preprogrammed association or master plan, now in the portable unit, being used as an automatic inventory checklist. If desired, the preprogrammed association may also cause the portable unit to provide visual or audible prompts to the operator, to remind the operator to check certain things within the space or room.

Since there is no need for the user to position the sensor very close to the tag, the tag can be placed at any convenient location on the object which may in fact be hidden from normal observation. Accordingly, the present invention finds particular utility in performing inventory control of furniture or other aesthetic objects since the tags can be hidden from sight thereby preserving their aesthetic appearances. Additionally, the data collection process for a plurality of different objects can be accomplished quite rapidly since the operator need not search and find the tags on the individual objects. Instead, all that the user needs to do is to position the sensor in the general location of the object since the tag will transmit its code over a considerable distance.

Preferably, the tag is of the type that transmits its code when energized by radio frequency (RF) energy. The portable unit employs a sensor in the form of an RF antenna for sending RF energy to energize the tags and for receiving the code signals from the tags. The unit further includes a reader for converting the received code signals into digital form and a digital data collection device with a memory coupled to the reader. The detected code signals can be used for a wide variety of purposes. In inventory control, the codes would be stored in memory whose contents can later be read out to provide an inventory list of detected items. According to a feature of this invention, the inventory control list can be generated by location in a building. This can be performed by mounting a tag adjacent to the entranceway or doorway of each room in a building. The operator would sense the code from the tag before entering the room which would identify all of the subsequently detected objects as being located in that room. In open plan office systems employing partitioned groups of modular furniture in an open room, the "location" tags can be affixed to reference points in the room defining particular areas therein.

The identification system of this invention can also be used for project scheduling or the like in which some work is to be performed on or in connection with a particular object or person. For example, individual patients in a health care facility or other institution can be provided with their own tags. The user would detect the code for each tag which would be fed into a programmable device having its own visual display. In response to the detected tag code, the programmable device would display certain information such as a readout of the description of the patient, or other suitable prompts. The user would perform the work and then enter a confirmation that the work had been performed thereby updating the data base. The programmable device would have a built-in timer so that it could record the time and date on which the work was performed. According to another aspect of the invention, the tag itself can be programmed with an updated code that when subsequently read would indicate the current status of the associated object or other pertinent information. This general concept can be extended to many other fields such as quality control, maintenance services, plant security and the like wherein a computerized system would display prompts or other information to the user in response to sensing the transmitted code from the tags.

Several advantages result from the inventive method whereby a preprogrammed association between objects and room or the master plan is stored in the random access memory of the location tags. In contrast to a centralized data base in which all information resides in a central computer, the inventive method distributes the information (contained in the location tags) throughout a building, where the information is less apt to be destroyed or tampered with. In addition, by storing the information about a particular space or room near that space or room, the responsibility for maintaining accurate records is more readily placed upon the person responsible for that space or room. Contrast this with a central data base where a keypunch operator not personally acquainted with a particular space or room is responsible for entering the information about that space or room into the central computer. Because of the keypunch operator's lack of familiarity with the particular space or room, keypunch errors are much more apt to occur and errors in inventory become more difficult to trace.

Still other advantages and uses of the present invention will become apparent to one skilled in the art upon a study of the following specification and by reference to the drawings.

BRIEF DESCRIPTION OF THE DRAWINGS

FIG. 7 is a typical floor plan of an open plan office; and

FIG. 8 is a flow chart useful in understanding the inventive method.

DESCRIPTION OF THE PREFERRED EMBODIMENTS

Figure 1:
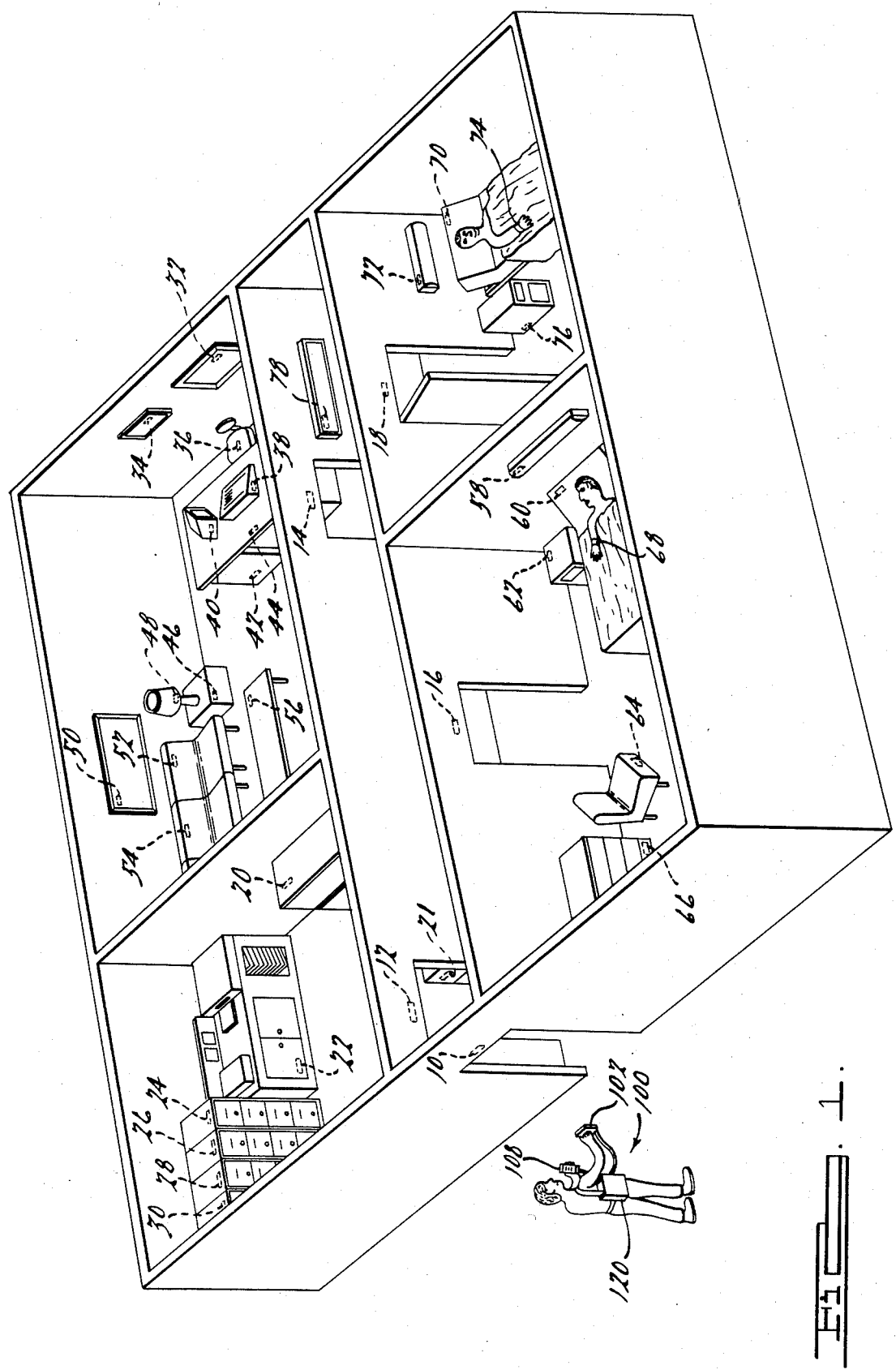
FIG. 1 is a perspective view of a building having a variety of tagged objects therein which can be read by a portable unit transported by the user as he walks through each of the various rooms.
Figure 2:
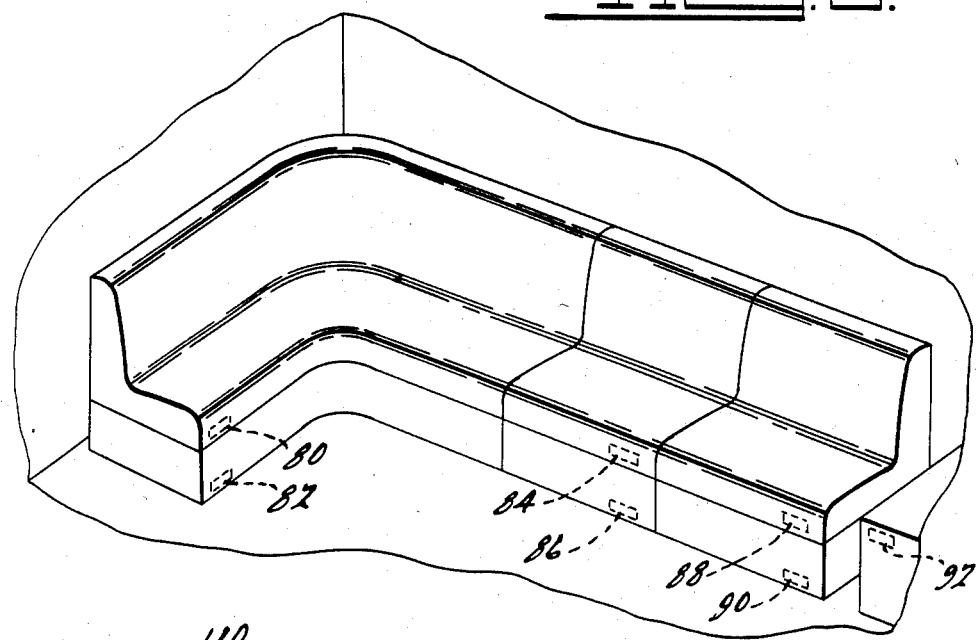
FIG. 2 is a view illustrating the use of tags on modular pieces of furniture.

Referring now to the drawings, a plurality of identification and location tags 10-92 are mounted at convenient locations on or adjacent objects desired to be identified. For purposes of this invention, an object includes persons and places as well as things. As used herein, location tags are associated with places, spaces, rooms, locations, and the like; while identification tags are associated with objects, persons, things, and the like. Each of the tags (identification and location) has its own particular code and is capable of wirelessly transmitting that code over a distance of at least one foot, preferably 1-5 feet. In most applications, it is preferred that the code be transmitted by radio frequency (RF) signals. The use of RF transmission has the advantage in that the transmitted signals are not disturbed by most normally found items in a building; and, therefore, the transmitted code can be detected by a suitable sensor without requiring a substantially direct "line of sight" between the transmitter and receiving devices as is generally required in optical transmission schemes. A presently preferred tag is manufactured by Allen-Bradley as part of its RF Identification System (see, e.g. Allen-Bradley publications 2750-1.0 dated April 1983 and February 1984). This tag is a passive device that powers itself from remotely generated RF energy. These tags are small, lightweight and include on board random access memory which can be programmed with thousands of different codes (presently consisting of 6 digits). Presently each tag has 10k of on board chip memory, although larger and smaller memory storage spaces may be used as required. As will appear, it is preferable in some applications that the tag codes can be changed and programmed from a remote source. These tags are referred to as read/write tags, whereas in other applications it may only be necessary to read the codes previously programmed into the tags (read only tags).

Figure 3:
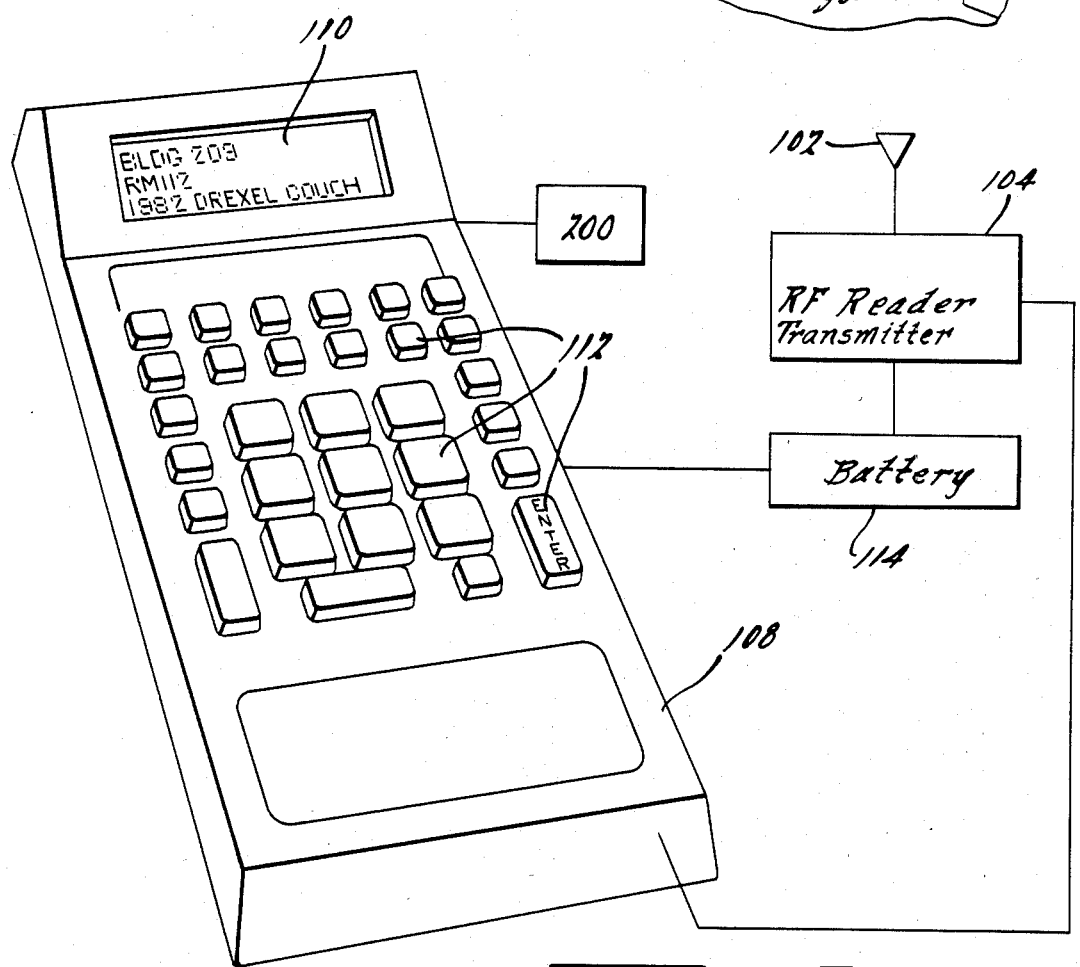
FIG. 3 is a view pictorially illustrating the portable unit made in accordance with the preferred embodiment of this invention.
Figure 4:
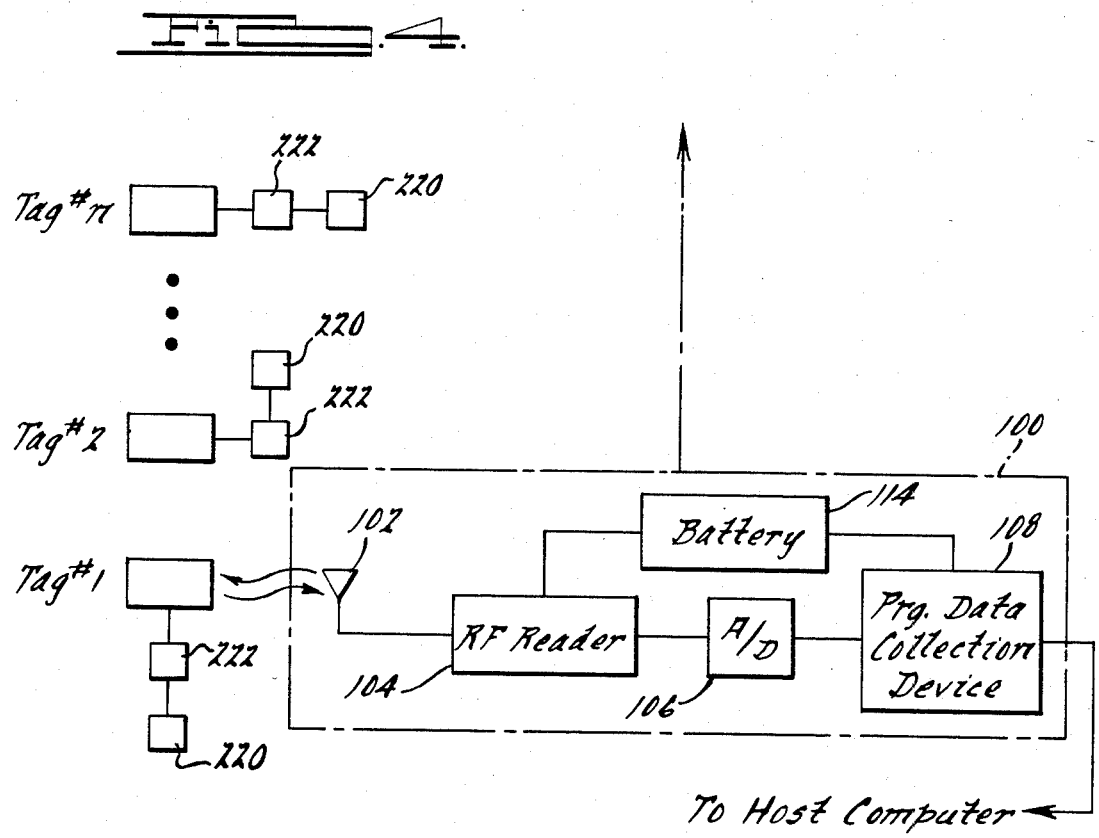
FIG. 4 is a schematic block diagram illustrating the use of the portable unit as it is transported past several tags.

Pursuant to the present invention, the tag codes are read by battery-powered portable unit 100 that can be easily transported or carried by a user. At the very least, the portable unit 100 should include a sensor for detecting the transmitted codes from the tags and some type of storage device for at least temporarily storing digital representations of the detected tag codes. Preferably, the portable unit includes an antenna 102 that can be held in the hand of the user and moved into the general proximity of the tagged object. Antenna 102 is designed to sense RF energy to energize the tags and to receive the transmitted codes from the tags. The antenna 102 is coupled to a reader/transmitter 104 whose function is to process the signals received over antenna 102 and to generate RF signals to broadcast over antenna 102. Preferably, reader/transmitter 104 includes analog-todigital circuitry 106 for converting the received codes into digital form suitable for storage in a conventional digital memory. Portable unit 100 further preferably includes a programmable data collection device 108 in the form of a hand-held computer terminal or portable computer having internal memory and an external display. The data collection device 108 also has an inboard analog time of day and date clock 200 which may be accessed in the usual fashion to place the time of day and/or date in a computer register or memory location for use in providing date and time information. FIG. 3 illustrates the portable unit 100 pictorially whereas FIG. 4 shows unit 100 in a schematic form. As shown most clearly in FIG. 3, the data collection device 108 is a hand-held product with a display 110 capable of displaying several lines of alphanumeric text. It further includes data entry devices such as keys 112 for programming and entering data into the device. A suitable data collection device is the UDI-100 Hand-Held Computer Terminal manufactured by Universal Data, Inc. of Clarkston, Mich. A suitable source for the antenna 102 and reader 104 is from the aforementioned Allen-Bradley Company.

It is important that all of the components of portable unit 100 be capable of operating on DC power to enable the unit to be truly portable. To this end, a battery power source 114 is provided. Of course, each of the individual components of unit 100 may have their own internal battery supply but, for ease in understanding this invention, the battery source is shown as a separate battery pack in the drawings. As illustrated in FIG. 1, the portable unit can be carried by the user as he walks through various locations through the building. As shown therein, the battery pack 114 and associated circuitry for the reader 104 may be conveniently packaged in an over-shoulder bag 120.

Although there are many possible adaptations of the invention to suit many different uses, the general method of the invention is illustrated in FIG. 8. In this regard, the invention will be explained assuming the use of the single location tag which would be affixed to a fixed structure associated with a predefined space or room. This description will also assume the existence of tags placed on a plurality of objects intended to be stored within that predefined space or room. These assumptions are made simply for the purpose of explaining the invention and are not intended as limitations thereof. In general, the invention may be practiced using any number of location tags and any number of identification tags. For purposes of understanding the invention, it is not necessary to differentiate between whether the location tags and tags are preprogrammed prior to or after being affixed to the respective locations and objects. In applications where all locations and/or objects start out essentially the same, then the tags might be preprogrammed in batches prior to being affixed to the locations or objects. On the other hand, if the locations and/or objects differ from one to the other, it may be advisable to affix the tag prior to preprogramming it in order to prevent the accidental placement of a tag to the incorrect location or object. Because both of these methods are possible, FIG. 8 does not differentiate between them.

Referring now to FIG. 8, Step 210 depicts the step of preprogramming a location tag with a master association between objects and a predefined space. Although the precise details of implementation may vary, the master association between the objects and the predefined space may be implemented as an association between the location code or portion of the location code indicative of the space or room and the identification code or codes of the objects to be stored within that space or room. The association may be as a one-to-one relationship, whereby each object's identification code (or some other code derived from the identification code) is paired up with the location code (or another code derived from the location code). These associated data may be stored as ordered pairs in the location tag, as part of the location code which is transmitted when the tag is read. The ordered pairs may be stored in the following fashion: (location 1, object 1); (location 1, object 2); ... (location 1, object n); assuming n objects are to be stored at location 1.

As another example, by way of explanation and not limitation, the master association may be in the form of a list whereby the location code (or some other code derived from the location code) would serve as a header for the list of identification codes (or other codes derived from the identification codes) which follow. For example, such a list might be represented in memory as follows:

| Location 1: |
| --- |
| Object 1 |
| Object 2 |
| Object 3 |
| . |
| . |
| Object n. |

Having preprogrammed the location tag to contain the master association, the inventive method proceeds to Step 212 in which the master association contained in the location tag is loaded into the memory of the portable computer or collection device 108. Next, in Step 214 the identification code or codes of the identification tag or tags are read from the object or objects within the predefined space. These codes are read by the reader/transmitter 104 and delivered to collection device 108 where they are entered into the memory of the collection device. Next, in Step 216 the master association, now loaded and stored in the portable computer of collection device 108, is compared with the identification codes read from the identification tag or tags. This comparison results in a determination of the status of the inventory of objects within the space or room. If desired, the status of this inventory may be displayed in Step 218, by outputting the inventory on display 110. Alternatively, if desired, the portable computer and reader/transmitter 104 may be used to reprogram the location tag in order to update the master association stored within the location tag. This step is illustrated at 220. Also, if desired, the master association can be used, as depicted in Step 222, to cause the portable computer to generate prompts to the user. Examples of such prompts may include messages displayed on display 110 alerting the user to certain maintenance schedules, lists of items to check within the room, and so forth.

Accordingly, from the foregoing, the invention thus provides a method of conducting an inventory of objects within a predefined space associated with a fixed structure. For a further understanding of the invention, several different examples of the invention in use will now be given.

The uses for this type of an identification system are many. One of the most important uses is performing inventory control. According to a feature of this invention, an inventory list can be generated of objects in a building by location. Assume that the building in FIG. 1 represents a hospital or other health care institution where the upper righthand room represents an adminstrative office, the upper lefthand room represents an office supply room, and the lower two rooms are for patients. Tag 10 is located adjacent the main entrance to the building whereas tags 12, 14, 16 and 18 are located above the doorways into each of the rooms. These "entranceway" tags should be mounted in a standard location so that the user knows generally where they are. However, it is not necessary that the tags be visually perceptible due to the wireless transmission scheme. The user walks through the main entranceway and moves the antenna 102 sufficiently close to the tag 10 to energize it and cause the tag to transmit its code. The code is detected by the reader 104 and fed into the programmable data collection device 108 in digital form. The digital representation of the received code is at least temporarily stored in device 108 long enough for it to acknowledge reception of the signal. Preferably, it will be stored in its memory and display 110 will illustrate some type of confirmation of the reception of the tag code, although this is not critical. In fact, it may be advisable to keep the use of display 110 to a minimum to preserve battery life.

After passing through the main entranceway, the user walks through the building until he reaches the doorway into a room in which he wants to inventory the objects therein. Assume that the user walks down the hallway and wants to inventory the articles in the administrative office. As he walks through the doorway, the user "wands" tag 14 to detect its particular code which will indicate the room in which the subsequently detected objects are located. The user then enters the room and places the antenna 102 in the general location of each of the objects, sufficiently close so as to receive the transmitted code from the tag on each object. As noted above, the display 110 may confirm reception of a code as illustrated in FIG. 3 where the building, room number, and year of purchase and identification of a couch are shown on display 110. By this process, all of the objects in a particular room are stored according to their location in the building. When the user walks into a different room, he senses the room tag and then proceeds in a similar manner to detect the tag codes on other objects in that room.

The present invention finds particular utility in providing inventory control of furniture, art objects and other aesthetic articles. This is because the tags can be hidden from view and yet they still are capable of transmitting their individual codes for detection. This is in contrast to the use of UPC or bar code-type labels which, if used, would tend to degrade the aesthetic appearance of such objects. This method is also particularly advantageous in performing inventory control in a warehousing facility of a manufacturer using systems or modular pieces that are later assembled to form a finished product. Each piece can be individually tagged and thus, the inventory would provide the manufacturer with a list of all in-stock pieces.

Figure 6:
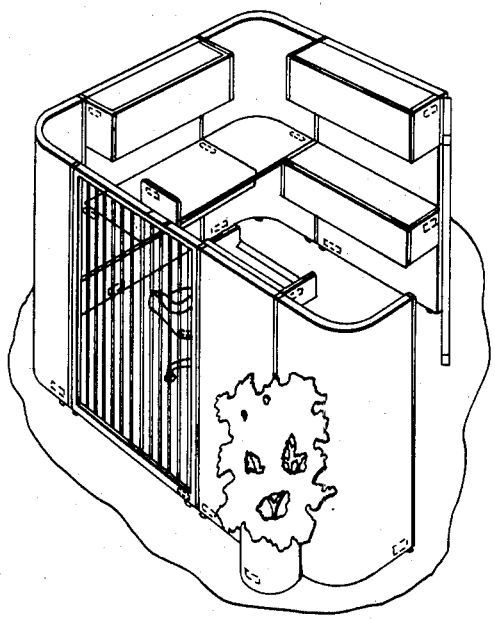
FIG. 6 is a perspective view of a grouping of interchangeable furniture components typically employed in an open plan office system.

This general concept is also particularly useful in taking inventory of modular furniture components including partition panels and associated components that are assembled together to form work areas in open plan office systems. A typical grouping is shown in FIG. 6 and a floor plan of an open room employing a plurality of these groupings is shown in FIG. 7. As in the above example, each of the components is tagged with its individualized code in an area where the tags do not unduly degrade the aesthetics of the objects. The tags mounted on the components are shown in dotted lines in FIG. 6. "Location" tags are also mounted at points in the room that divide it up into different areas or zones. In FIG. 7 this is done by placing tags 150-172 on posts or other landmarks about the room. (The tags on the individual components are not shown in FIG. 7). Effectively, the location tags define coordinates of an imaginary grid overlaying the room. To provide an inventory according to zones in the room, the user would use the portable unit to sense the codes from tags located at points defining the boundary of the zone and then proceed to sense the codes transmitted from the tags on the furniture components within that zone. For example, the user would sense the tags 154, 156, 164 and 162 on the posts in the upper lefthand zone of the room, with the data collection device 108 being programmed to translate the codes into information identifying that particular zone in the room. The "zone" information is then stored in memory along with the subsequently detected objects in that zone.

Figure 5:
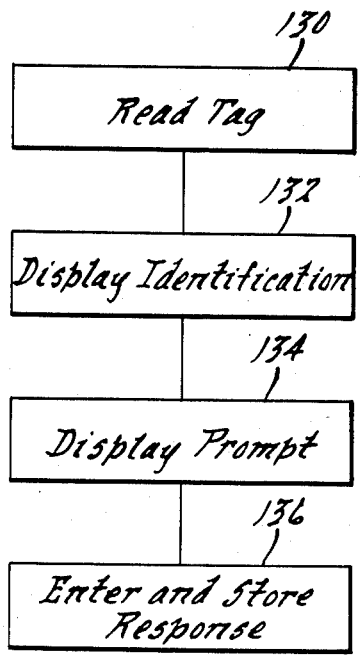
FIG. 5 is a flow chart illustrating some of the general steps that can be performed in carrying out certain aspects of the method of this invention.

Another feature of this invention is a method of identifying persons in a health care facility or other institution. A uniquely coded tag is placed on or adjacent to each patient. For example, tags 60 and 70 are affixed to the beds for each patient whereas tags 68 and 74 are affixed to wrist bands on the patient. The programmable data collection device 108 is programmed with information about each patient along with the patient's individualized tag code. This information can consist of such things as the treatment that the patient is to have, his medication, etc. As illustrated in FIG. 5, the nurse or other staff member would use the portable unit 100 to read the tag (Step 130) and the data collection device 108 would display an identification of the patient (Step 132). Because of the wireless transmission scheme, it is not necessary for the user to disturb the patient who may be sleeping since close contact is not required to detect the tag code. Device 108 then may prompt (Step 134) the user to perform some type of treatment, or give the patient his medication, etc. After doing so, the user would use the keyboard 112 to enter the store a response in the memory of device 108 (Step 136). Device 108 preferably has its own internal timing mechanism whereby the date and time of the responsive entry is automatically stored along with the confirmation. In such manner, an updated record of patient treatment is provided. An optional feature would be to provide the patient with a read/write type of tag and to use the device 108 to send appropriate RF signals to change the code to reflect the current status of treatment of the patient. In such instances it may be advisable to reserve some of the code digits for patient identification purposes (which would not be changed) while other digits can be changed to provide updated information.

This general method can also be used for such things as project scheduling where work on a particular object or in a particular room needs to be performed or checked. For example, a schedule of work to be performed in the office supply room can be stored in the device 108. This schedule of work may include such things as checking the paper and toner level in the photocopy machine, checking to make sure that sufficient postage is left in the postage meter, and things of this type. When the user walks through the door, he detects the code transmitted from tag 12. In response thereto, the display 110 will prompt the user to perform the programmed series of checks or other work associated with the objects in that room. After performing the work, the user may enter confirmation that it has been performed thereby updating the schedule in the memory of device 108 or in the code of the tag itself.

Still other methods include product maintenance (PM maintenance) where an object that needs to be serviced or periodically replaced (e.g. lighting fixtures, engines, drapes, flooring, growing plants, etc.) is provided with a tag. The user would sense the transmitted code and the programmable device 108 would prompt him to change the light bulb, service the engine, etc. if a programmable time period has elapsed. In this regard, the location tag or identification tag may be provided with a timer 220 in communication with the onboard memory 222 of the tag, in order to alter the code produced by the tag to reflect the elapsed time. In the alternative, the inboard analog time of day and date clock of the portable unit may be used to provide a time of day/date update signal for transmitting to the tag. The updated time/date value would then be stored in the memory of the tag to thereby alter the code produced by the tag. Where the tag itself if provided with a timer, the portable unit may be used to reset the timer in order to reset the elapsed time back to an initialized value. Plant security personnel (e.g. night watchmen) can benefit from a method whereby buildings are tagged; the codes read by the user who is prompted to check or do certain things, and a record of the event is stored in the memory of the portable unit or updated on the tag codes. The identification and proper delivery of baggage in airports or hotels is still another use of the identification method of this invention.

From the foregoing, those skilled in the art can appreciate that the method of this invention has significant advantages over conventional techniques. The work can be performed quickly and easily since the user does not have to spend a considerable amount of time in finding the tags for each object. Due to the wireless transmission scheme, it is only necessary that he position himself in the general area of the object to detect a transmitted code. As noted before, the tags can be placed in any convenient location thereby preserving the aesthetic appearance of the objects, if this is a concern. Therefore, while this invention has been described in connection with particular examples thereof, other modifications will become apparent to those skilled in the art after a study of the specification, drawings and following claims.

What is claimed is:

1. A method of conducting an inventory of objects within a predefined space associated with a fixed structure, comprising:
defining an association between said predefined space and said objects;
storing data which defines said association in at least one location tag being capable of wireless transmission of a location code indicative of said data and mounting said location tag to a fixed structure associated with said predefined space;
for each object to be inventoried, using at least one identification tag being capable of wireless transmission of an identification code indicative of said object and mounting said identification tag to each object to be inventoried;
using a portable unit having noncontacting means for receiving and storing said location codes indicative of said data and said identification codes;
transporting said portable unit to the vicinity of said fixed structure to thereby receive and store said location code produced by said location tag on said fixed structure and to thereby download said data into said portable unit;
transporting said portable unit to the vicinity of at least one of said objects within said predefined space to thereby receive and store said identification code produced by said identification tag on said one of said objects; and
comparing said downloaded data and said stored identification code in said portable unit to thereby conduct said inventory.

2. The method of claim 1 wherein said association is defined by storing a predefined list of identification codes associated with objects within said predefined space and associating said list with at least a portion of said location code is used to identify said predefined space.

3. The method of claim 1 further comprising:
wherein said portable unit has means for transmitting code change signals to at least one of said tags and using said portable unit to alter a plurality of times the code of at least one of said tags from an existing code to a different code not dependent upon the existing code.

4. The method of claim 1 further comprising:
generating prompt messages in response to at least one of said location codes and said identification codes and displaying said message on said portable unit.

5. The method of claim 1 further comprising:
providing a timer in communication with at least one of said location tags and identification tags and altering the code produced by said tag in response to said timer.

6. The method of claim 5 further comprising:
resetting said timer using said portable unit.

7. A method of taking inventory of objects in a building by location, said method comprising:
mounting identification tags on each of the objects, each identical tag having a particular identification code and being capable of wirelessly transmitting the identification code over a distance of at least one foot;
mounting locations tags at various locations in a building where the objects may be found, each location tag having a particular location code containing an association of said objects with said location and being capable of wirelessly transmitting the location code over a distance of at least one foot and being capable of having the location code changed a plurality of times;
providing battery power to a portable unit having a sensor means for receiving the transmitted location codes and identification codes and converting them into digital signals, said portable unit further including a data collection device having a digital memory;
transporting the portable unit to a given location where a group of objects are found;

manually moving the sensor means sufficiently close to the location tag associated with the location of the objects to read the transmitted location code;

storing digital representations of the location code in the memory;

moving the sensor device sufficiently close to the objects at that location to read the individual identification codes from the identification tags on the objects;

storing digital representations of the received identification codes in said digital memory;

forming an association in said digital memory between said identification codes and said location code;

using said formed association to cause said portable unit to write by wireless transmission said received identification codes to at least one of said locations tags to thereby alter the association of objects contained in said one location tag;

whereby an inventory of the objects by location in the building can be obtained and stored in at least one said location tags.

8. The method of claim 7 wherein the location tags are mounted adjacent the doorways entering into the rooms in the building.

9. The method of claim 7 wherein said location and identification tags are adapted to transmit their respective location and identification codes when energized by radio frequency (RF) energy, and wherein the sensor in the portable unit comprises an antenna for sending RF energy to energize the location and identification tags and for receiving the respective location and identification codes transmitted from the location and identification tags in response thereto.

10. The method of claim 7 wherein at least some of the objects are furniture and the identification tags are mounted thereon at points that are not readily observable thereby preserving the aesthetic appearance of the furniture.

11. The method of claim 10 wherein the furniture is in the form of modular components assembled together to from work areas in an open plan office.

12. The method of claim 7 wherein location tags are placed at spaced locations about a room defining zones therein and wherein the user senses the location codes defining a particular zone before sensing the identification codes from the tags on the components in that zone.

* * * * *

UNITED STATES PATENT AND TRADEMARK OFFICE
CERTIFICATE OF CORRECTION

PATENT NO. : 4,688,026

DATED : August 18, 1987

INVENTOR(S) : James R. Scribner, Thomas G. Brown and Anthony Caracciolo, Jr

It is certified that error appears in the above-identified patent and that said Letters Patent is hereby corrected as shown below:

Column 1, line 36, "wit" should be -- with --.

Column 1, line 41, "one" should be -- once --.

Column 2, line 12, "preprogramed" should be -- preprogrammed --.

Column 8, line 47, "the" (second occurrence) should be -- and --.

Column 9, line 27, "if" should be -- is --.

Column 10, line 48, Claim 7, "identifical" should be -- identification --.

Column 11, line 26, Claim 7, after "one" insert -- of --.

Column 12, line 20, Claim 11, "from" should be -- form --.

Signed and Sealed this

Twenty-second Day of March, 1988

Attest:

DONALD J. QUIGG

Attesting Officer

Commissioner of Patents and Trademarks